United States Patent [19]

Kauschke

[11] 4,225,540
[45] Sep. 30, 1980

[54] PACKING FOR HEAT AND MATERIAL EXCHANGE, PARTICULARLY FOR COOLING TOWERS

[75] Inventor: Michael Kauschke, Aachen, Fed. Rep. of Germany

[73] Assignee: Carl Munters-EUROFORM, Aachen, Fed. Rep. of Germany

[21] Appl. No.: 28,826

[22] Filed: Apr. 10, 1979

[51] Int. Cl.³ .................................................. B01F 3/04
[52] U.S. Cl. ........................... 261/112; 261/DIG. 11
[58] Field of Search ........ 261/112, DIG. 11, DIG. 72

[56] References Cited

U.S. PATENT DOCUMENTS

| | | |
|---|---|---|
| 3,265,550 | 8/1966 | Lindqvist .......................... 261/112 X |
| 3,281,307 | 10/1966 | Moeller et al. ................... 261/112 X |
| 3,500,615 | 3/1970 | Meek ................................ 261/112 X |
| 3,526,393 | 9/1970 | Meek ................................ 261/112 X |
| 3,574,032 | 4/1971 | Norback et al. ................. 261/112 X |
| 3,599,943 | 8/1971 | Munters ........................... 261/112 X |
| 3,618,778 | 11/1971 | Benton et al. .................... 261/112 X |
| 3,785,620 | 1/1974 | Huber ............................... 261/112 X |
| 3,801,419 | 4/1974 | Meek ................................ 261/112 X |

Primary Examiner—Richard L. Chiesa

[57] ABSTRACT

The invention relates to packing for heat and material exchange, particularly for cooling towers, composed of several layers of a corrugated or folded foil, whereby the corrugations or folds of adjacent layers cross and support one another, and a process for producing said packing.

7 Claims, 7 Drawing Figures

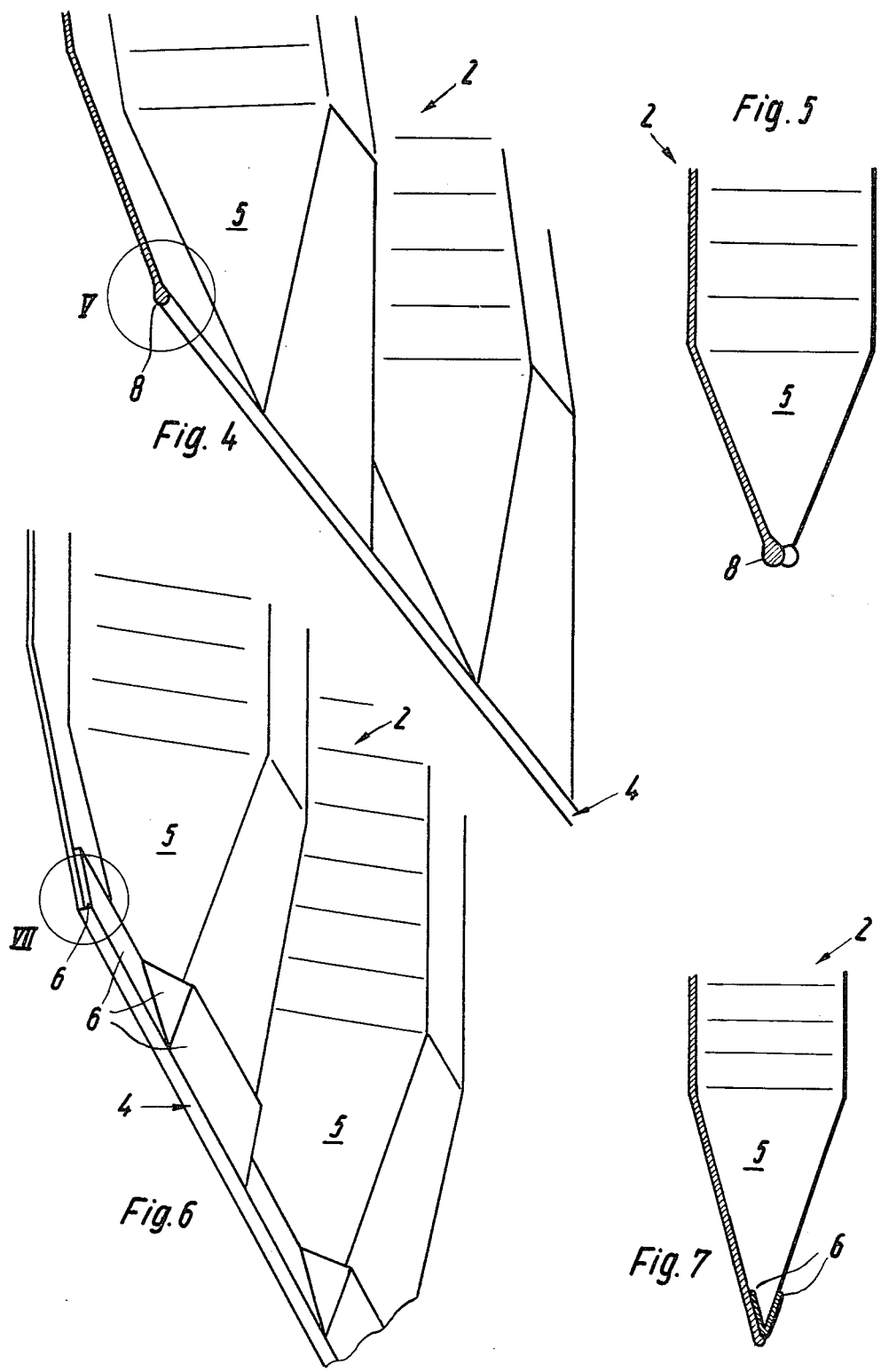

PACKING FOR HEAT AND MATERIAL EXCHANGE, PARTICULARLY FOR COOLING TOWERS

BACKGROUND OF THE INVENTION

A packing of the aforementioned type is already known from the German Auslegeschrift No. 1,776,210. The packing is composed of thin layers of a non-metallic working material, in particular plastic. The corrugations or folds of adjacent layers are joined together at their intersection points by adhesive or welding to produce a uniform body. To increase the mechanical strength of the packing, it is known from the German Ausgeleschrift No. 1,776,210 to provide the two longitudinal sides of the layers with a reinforcing edge which has a greater mechanical strength than the inner portions of the layers. In the finished packing one longitudinal edge forms the lower edge of the packing. The reinforced edge should contribute to increasing the mechanical strength of the packing against external loads and also to the stability of shape of the folds. It has been shown that inspite of the improved construction, a secure position of the packing on the supporting points is not guaranteed in particular with temperature loads over a long period of time, which can at times exceed the specified operating temperature. Tests have been made to meet these difficulties by increasing the temperature stability of the plastic. This can involve considerable additional costs.

Further, the German Auslegeschrift No. 22,34,013 proposes to fold over the edge of the plastic layer before corrugations or folds are formed in order to produce a reinforced longitudinal edge in a plastic foil packing. This packing therefore has a longitudinal edge reinforced by folding having corrugations or folds.

SUMMARY OF THE INVENTION

Working from the German Auslegeschrift No. 1,776,210 the object of the present invention is to propose a simple packing construction which guarantees a safe position of the packing on the supporting points even under longer temperature loads.

This object is solved according to the invention in that of the upper and lower longitudinal edges of each layer at least one is constructed in the form of a continuously straight longitudinal edge and the corrugations or folds of each layer pass into said straight longitudinal edge in a transition area. In the transition area the corrugations or folds flatten towards the straight longitudinal edge. The present invention is based on the knowledge that with the known packing even a reinforced edge can not prevent the packing from sagging between the supporting points, as the corrugated profile of the foil fans out with longer temperature loads and higher loads (large amount of water). This fanning out can be compared approximately with the movement of a concertina. Even the reinforced edge can not perceptibly oppose this fanning out as the reinforced edge fans out with the foil. In the known constructions it can even result that the packing drops down between the supporting points. The stretching in the form of fanning out movement is not possible with the the construction according to the invention as the continuously straight longitudinal edge guarantees a high degree of inherent rigidity of the packing.

With respect to possible alternatives, merely the upper longitudinal edge can be constructed as continuously straight longitudinal edge. An expedient embodiment is provided when the upper and the lower longitudinal edge are constructed as continuously straight longitudinal edges. This construction facilitates not only the inherent rigidity but also the construction given specific process conditions. Another preferred alternative consists in only the lower longitudinal edge being constructed as continuously straight longitudinal edge, as the greatest loads arise in the area of the lower edge.

It has proved expedient when the corrugations or folds of the packing pass into the straight longitudinal edge in the transition area. The transition area with continuous flattening should preferably amount to 1/10, particularly 1/20 of the entire height of the packing. The straight longitudinal edge preferably amounts to 3%, particularly 1 to 2%, of the height of the packing. A transition area with continuous flattening to the straight longitudinal edge is guaranteed when the transition area is acute-angled when viewed in cross-section. As FIGS. 2, 5 and 7 show, this acute angle results with a cross-section through a layer firstly when the cut side of a corrugation is viewed and secondly the side edge (uncut) of the next corrugation lying underneath this is viewed. The acute angle amounts preferably to 20° To 75°, depending on the height of the corrugation.

To improve the inherent rigidiy of the packing it is expedient to reinforce the straight longitudinal edge of each layer in relation to the remaining portion of the layer. This is preferably achieved by folding over the longitudinal edge. It is of further advantage when a reinforcement is inserted into the folded portion. A round bar, e.g. of carbon fibres, glass fibres, plastic, metal wire, is recommended as reinforcement. A round bar is advantageous as it can not cause the packing to kink or notch. The reinforcement for folding can, alternatively, be provided by thickening the foil material in the area of the longitudinal edge, i.e. by using the same working material. For this, the reinforced edge can be formed at the same time as the foil is being extruded to simplify the process. Within the scope of the invention plastic strip material is preferably meant when the terms foil profile and foil strip are mentioned. A suitable foil thickness lies within the range of 0.2 to 0.6 mm. Thin metal, paper or fabric strip materials are considered in the wider sense of the word foil too.

A suitable production process for producing the thermoplastic plastic packing consists in a strip of foil being held at a temperature below the thermoplastic range in the area of one or both longitudinal edges as viewed in the direction of production whilst the remaining portion is corrugated or folded at a temperature in the thermoplastic range, whereby the longitudinal edge(s) having a low temperature is (are) conveyed parallel to the direction of production. The longitudinal edge(s) can be conveyed, for example, via a straight path extending in the direction of production. The longitudinal edge with lower temperature is then led into this path, e.g. along the lines of a groove-spring connection, and is prevented from moving diagonally by this path during the thermal deformation of the remaining portion of the foil strip so that the thermal deformation can be carried out without the straight longitudinal edge being reshaped. A preferred alternative for the process consists in a plastic foil being extruded and one or both longitudinal edges being quenched below the softening temperature while the extruded plastic foil is still in hot state, and in the remaining area being corrugated or folded while still in hot state. The quenching can, for example, be achieved by means of compressed air or other quick cooling means. The cooled longitudinal edge can then be maintained safely in the direction of production during thermal deformation, e.g. by being held down or by a guide groove, so that diagonal stretching in the area of the longitudinal edge can not occur. In the case of usual plastic strip materials at the longitudinal edge lower temperatures, preferably a temperature of below 110° C., should be set. A particularly simple production method is given when both longitudinal edges are quenched as in this case a particularly favourable guidance of the foil strip is possible in the thermal deformation process as the foil strip can be conveyed on both sides over the longitudinal edges with lower temperature.

The packing according to the invention has the following advantages in particular: The packing has a high degree of inherent rigidity also with temperature loads over a long period of time, even when these exceed the normal operating temperatures, thus guaranteeing safe positioning. This positioning also applies with higher water loads and/or with greater distances between the supporting points. Thus, it is possible to select greater distances between supporting points and nevertheless work with inexpensive plastics.

BRIEF DESCRIPTION OF THE DRAWINGS

The subject of the invention is explained in further detail below by means of FIGS. 1 to 7.

FIG. 4 shows a perspective representation of a layer of the foil profile of the packing;

FIG. 5 shows an enlarged section of FIG. 4;

FIG. 6 shows alternative embodiments to the subject of FIG. 4 and

FIG. 7 shows an enlarged section of FIG. 6.

BRIEF DESCRIPTION OF THE PREFERRED EMBODIMENT

Figure 1:
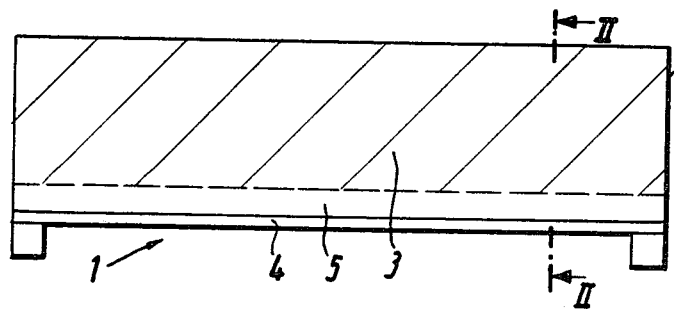
FIG. 1 shows a lateral view of a packing body.
Figure 2:
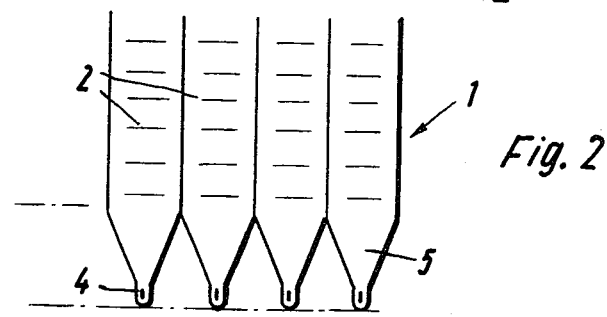
FIG. 2 shows a cross-section according to II-II of FIG. 1.
Figure 3:
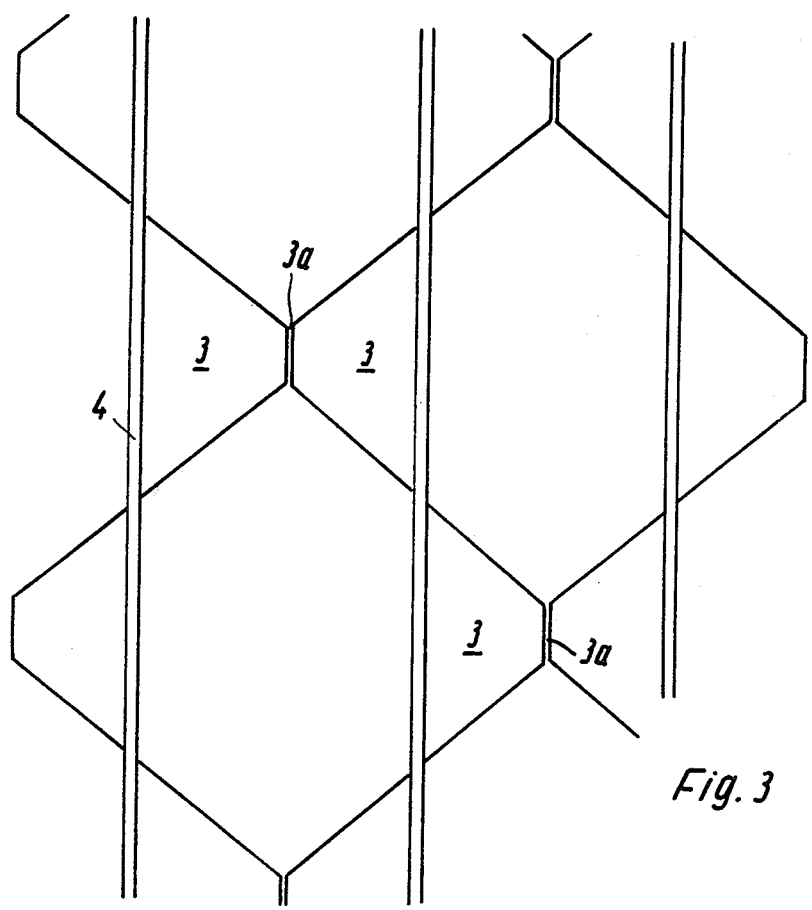
FIG. 3 shows a view from below onto the packing body on an enlarged scale.

The packing body referenced as a whole as 1 is made up of several layers 2 of a foil profile, four of which layers 2 are represented in FIG. 2. The individual layers each have corrugations 3, the height of which can, for example, amount to between 10 and 30 mm. The corrugations 3 of the individual layers 2 touch at the intersection points 3a and are joined to one another at these contact points by, for example, adhesive. The embodiment of the lower end portion of the packing body 1 shown in the figures is considered essential. The upper end portion of the packing can be constructed accordingly. This detail however was not shown in the figures as there are no differences in construction.

As FIGS. 2 to 7 show, the corrugations 3 of the packing 1 pass into the continuous straight lower longitudinal edge 4 in a transition area 5. The cross-sections in FIGS. 2, 5 and 7 show that the corrugation 3 passes over a wedge-shaped flattened portion (acute-angled embodiment) into the lower longitudinal edge 4 in the transition area 5. In this cross-section it must be taken into consideration that only the front left-hand side edge of each layer 2 is in actual fact cut whilst the shown right-hand side edge of the next corrugation 3 following in the direction of vision lies behind the cutting plane.

FIGS. 4 to 7 illustrate by example of a single layer two possible embodiments for the lower portion of the packing 1 which is composed of several such layers 2. According to the alternative shown in FIGS. 4 and 5 the layer 2 of foil profile has a material thickening 8 as straight longitudinal edge 4 which is round in cross-section or teat-shaped. The material thickening 8 is composed of the same working material as the rest of the foil profile and can, for example, be twice to five-times as thick as the foil profile. The material thickening 8 and the transition area 5 can be produced directly during the production of the foil profile.

According to a particularly preferred alternative embodiment according to FIGS. 6 and 7 the straight reinforced longitudinal edge 4 is provided by folding 6 the foil strip upwards. This folding 6 can be compared with the pleating of fabric. The height of the folding 6 depends on the height of the packing 1 and can, for example, amount to 10 to 25 mm. The packing 1 stands on the lowest end of the folding 6. To increase the inherent rigidity it is of advantage to insert a reinforcement in the form of a thin round bar in the area of the lower end of the folding. This advantageous embodiment is not shown in FIGS. 6 and 7.

In a particularly suitable production process of layers 2 the hot foil strip, which can come from a magazine roll or directly from the extruder, is held in the area of the forming temperature of the respective foild material. In the embodiment according to FIGS. 6 and 7 the folding is then carried out. Following this, the foil strip is quenched towards the longitudinal edge, i.e. in the area of the flattening, so that the temperature of the foil profile promotes the flattening required in the transition area 5. Therefore, a continuous increase in temperature in the transition area is receoommended rom the longitudinal edge with lower temperature. In the case of usual plastic foil profiles the temperature in the area of the longitudinal edge should amount to 70° to 110° C., for example. The temperature is considerably higher in the area of the corrugations.

I claim:

1. A packing for heat and material exchange in cooling towers, comprising a plurality of layers of a corrugated foil, said layers being positioned with the corrugations of adjacent layers crossing and supporting one another, said layers each having upper and lower longitudinally extending edges at least one of which is formed as a continuous straight longitudinal edge, said corrugations of each layer having a transition area wherein they taper from their maximum height into said straight longitudinal edge.

2. A packing as defined in claim 1 wherein said at least one edge is the lower edge of the layers.

3. A packing as defined in claim 1 wherein said transition area has an acute-angled cross-section.

4. A packing as defined in any of claims 1, 2, or 3 wherein said continuously straight longitudinal edge is reinforced in relation to the remainder of the layer.

5. A packing as defined in claim 4 wherein said straight longitudinal edge is thicker than the remainder of said layer.

6. A packing as defined in claim 4 wherein said straight longitudinal flat edge is folded over to reinforce that edge.

7. A packing as defined in claim 6 including a reinforcing inserted in said folded edge.

* * * * *